April 19, 1938.   H. E. TWOMLEY   2,114,729
COMBINED BOX LIDDER AND STRAPPER
Filed July 28, 1931   8 Sheets-Sheet 1

Inventor
Herbert E. Twomley
By Lyon + Lyon
Attorneys

Inventor
Herbert E. Twomley
By Lyon & Lyon
Attorneys

Inventor
Herbert E. Twomley
By Lyon & Lyon
Attorneys

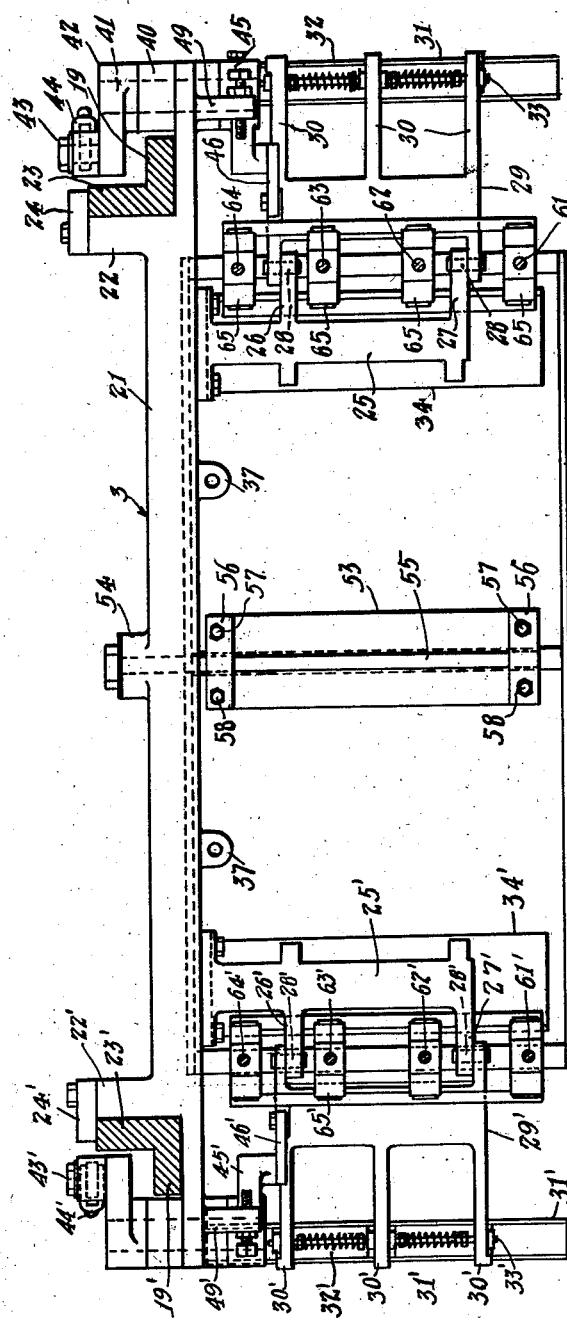

Patented Apr. 19, 1938

2,114,729

UNITED STATES PATENT OFFICE 2,114,729

COMBINED BOX LIDDER AND STRAPPER

Herbert E. Twomley, Riverside, Calif., assignor, by mesne assignments, to Food Machinery Corporation, a corporation of Delaware Application July 28, 1931, Serial No. 553,496

58 Claims. (Cl. 1—10)

My invention relates to box nailing and strapping machines, and has particular reference to a combined machine in which the operations of securing a lid to a box and applying a strap thereto may be accomplished automatically.

In the art of packaging articles, particularly with reference to packaging or boxing fruits, vegetables, and plant products in wooden boxes, it is common practice to pass a filled box to a lidding machine in which a cover is placed over the box, and the machine then nails the cover to the body of the box. The box is then passed to a second machine in which a metal wire or strap is secured across the center of the cover on the box to hold the central part of the cover in secure relation to the box. In prior devices, it has been the practice to have these two machines separate and require entirely separate operations for securing the lid and securing the strap.

It is an object of my invention to provide a combined machine in which the operations of securing the lid to the box and of securing the strap to the box may be performed.

Another object of the invention is to provide a machine of the character described in the preceding paragraph in which a lid may be secured to one box and a strap secured to another box, simultaneously.

Another object of the invention is to provide a combined box lidding and strapping machine, in which the lidding machine and the strapping machine are arranged in tandem relation, with a box conveying device interposed between the machines so that a box, the lid of which is secured by the lidding machine, will be automatically passed to the strapping machine.

Another object of the invention is to provide a combined machine, as described in the preceding paragraph, in which a single operation on the part of an attendant or operator of the machine causes the lid to be secured to one box and the strap to be secured to a box previously lidded by the lidding machine.

Another object of the invention is to provide a combined box lidding and strapping machine in which a conveyor is employed to feed the boxes to the lidding machine and to the strapping machine, and in which the boxes passing along the conveyor are automatically controlled so as to insure interval feeding of the boxes to the two machines in accordance with the operations of the machine.

Another object of the invention is to provide a box lidding and nailing machine in which press frames for pressing the lid upon the box are power driven to their box-engaging positions.

Another object of the invention is to provide a box lidding and nailing machine which is provided with means for tucking in the contents at the ends of the boxes in advance of pressing the lid into engagement with the box to prevent pinching of the contents of the box.

Another object of the invention is to provide a box lidding and nailing machine in which tucking devices are provided for all four sides of the boxes to insure that the contents of the boxes will lie within the interior vertical planes of the sides and ends of the boxes when the lid is placed in contact with the box.

Other objects of my invention will be apparent from a study of the following specifications, read in connection with the accompanying drawings, wherein Fig. 1 is a front elevational view of my combined lidding and strapping machine shown in the position with the machine ready for the entry of boxes to be treated;

Fig. 9 is a detail top plan view of a portion of the box lidding and strapping machine illustrating the assembly of the press frame, this view being taken along line IX—IX of Fig. 2.

Figure 1:
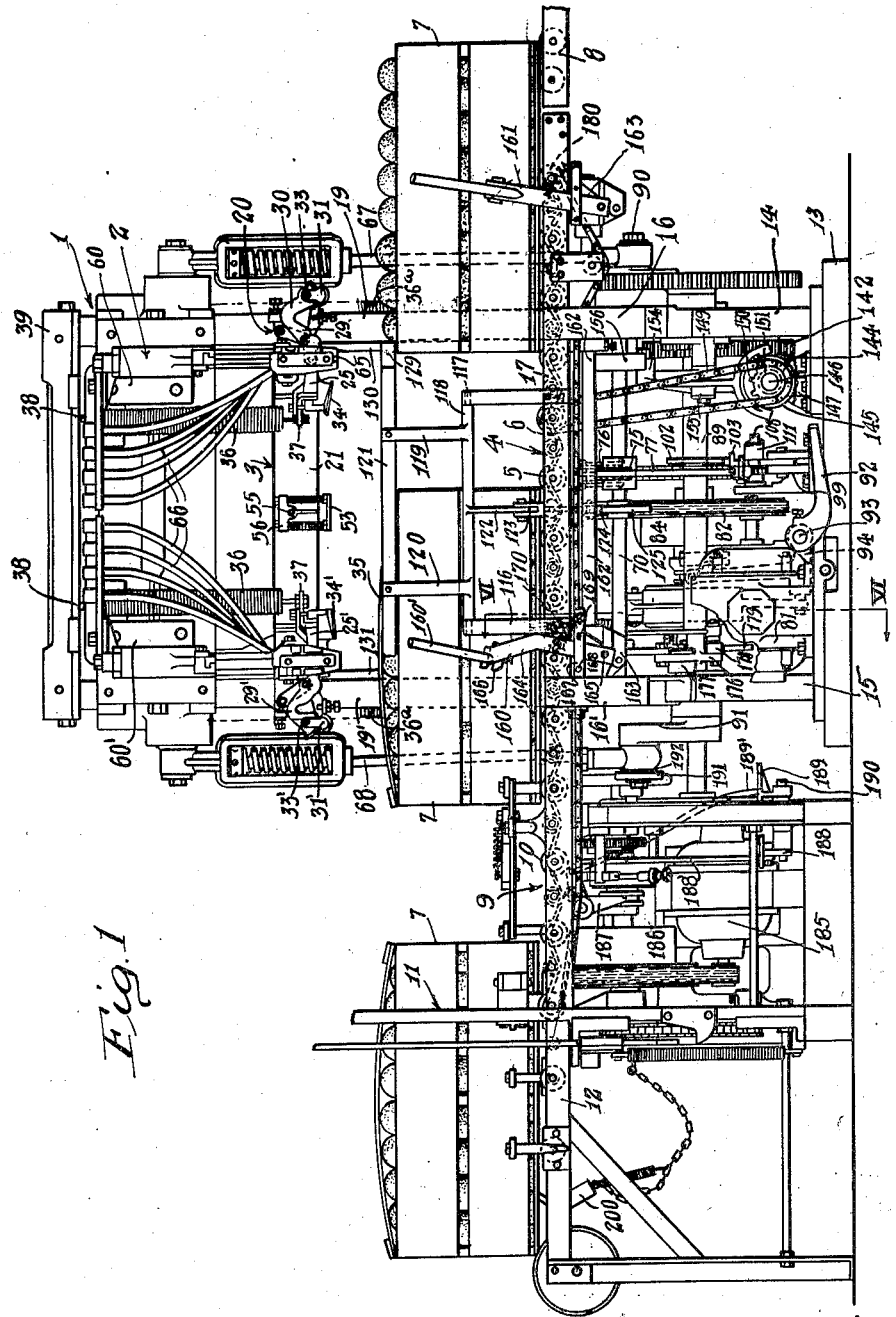

Referring to the drawings, I have illustrated in Fig. 1 a box lidding and nailing machine at 1, this machine including means for applying lids to boxes comprising a vertically reciprocating nail driving head 2 and a vertical reciprocating press frame 3 secured above a nailing table 4, the machine being in general similar to that described in the patent to George D. Parker, No. 1,576,213.

The table 4 constitutes a box conveyor extending longitudinally of the machine, being formed of a plurality of rollers 5 interconnected by means of a driving chain 6 by which the rollers may be driven to move boxes of fruit or similar articles 7 longitudinally of the machine 1.

The table 4 of the box lidding machine 1 is arranged in substantially abutting relation with the end of a roller feeder conveyor 8, by which boxes of fruit are fed to the right hand end of the machine 1. At the left hand end of the machine 1, the table 4 continues in an extension 9 which is constituted by conveyor rollers 10, the driving chain 6 passing into driving engagement with the rollers 10 of the extension to drive the same in synchronism with the movements of the rollers 5 on the table 4.

A box strapping machine is indicated by the reference character 11 as having its table 12 aligned with the extension conveyor rollers 10 to constitute in effect a continuation of the conveyor 10.

The detailed mechanism of the box strapping machine has been omitted, since the details of construction of this machine are not material to the present invention, it being sufficient to note that the details of a strapping machine, useable with my invention, are well known in the art as illustrated by the patents to George D. Parker, Nos. 1,715,780 and 1,739,085 and 1,777,474.

Referring particularly to the box lidding machine, it will be observed that the nailing table 4 of the machine is supported at a considerable height from the level of the floor upon which the machine may be placed, as by means of a suitable supporting structure comprising a base plate or casting 13 from either end of which rise vertical end frames 14 and 15, respectively. The end frame 14 is illustrated particularly in Fig. 2 as having a shelf portion 16 extending forwardly of the machine to constitute a frame to which longitudinal bars 17 and 18 may be secured, which bars, in turn, support the rollers 5 constituting the conveyor forming the box supporting table 4 of the nail driving machine.

The frame 14 is also provided with a vertically extending upright 19, upon which is slidably mounted, as at 20, the reciprocating press frame. The frame 15 at the left hand end of the nailing machine 1 is likewise provided with a forwardly extending section 16' and with an upright section 19', having slidably connected therewith the left hand end of the press frame 3.

Referring particularly to Figs. 1 and 9, the press frame 3 is illustrated as comprising a cross bar 21 extending longitudinally of the frame and having a rearwardly extending arm 22 formed thereon to engage the vertically extending guide 23 formed integrally with the upright 19. A gib 24 may be secured on the opposite side of the guide 23 to retain the cross bar 21 in slideable relation with the upright 19.

A forwardly extending bracket 25 is secured to the front face of the cross bar 21 and is provided with a pair of outwardly extending fingers 26 and 27 to the outer ends of which are secured, as at 28, ends of a swinging flusher 29. The swinging flusher 29 is formed with its right hand end comprising three forwardly extending fingers 30, this portion of the flusher having substantially the shape of the letter E. The flusher so constructed forms a link-like support for a pair of tuckers 31 and 32 which are pivotally connected between outstanding fingers 30 of the flusher 29, each of these tuckers having substantially the shape of the letter F, the arms of which nest between two of the outstanding fingers 30 to which they are secured as by means of a pivot rod 33.

Figure 3:
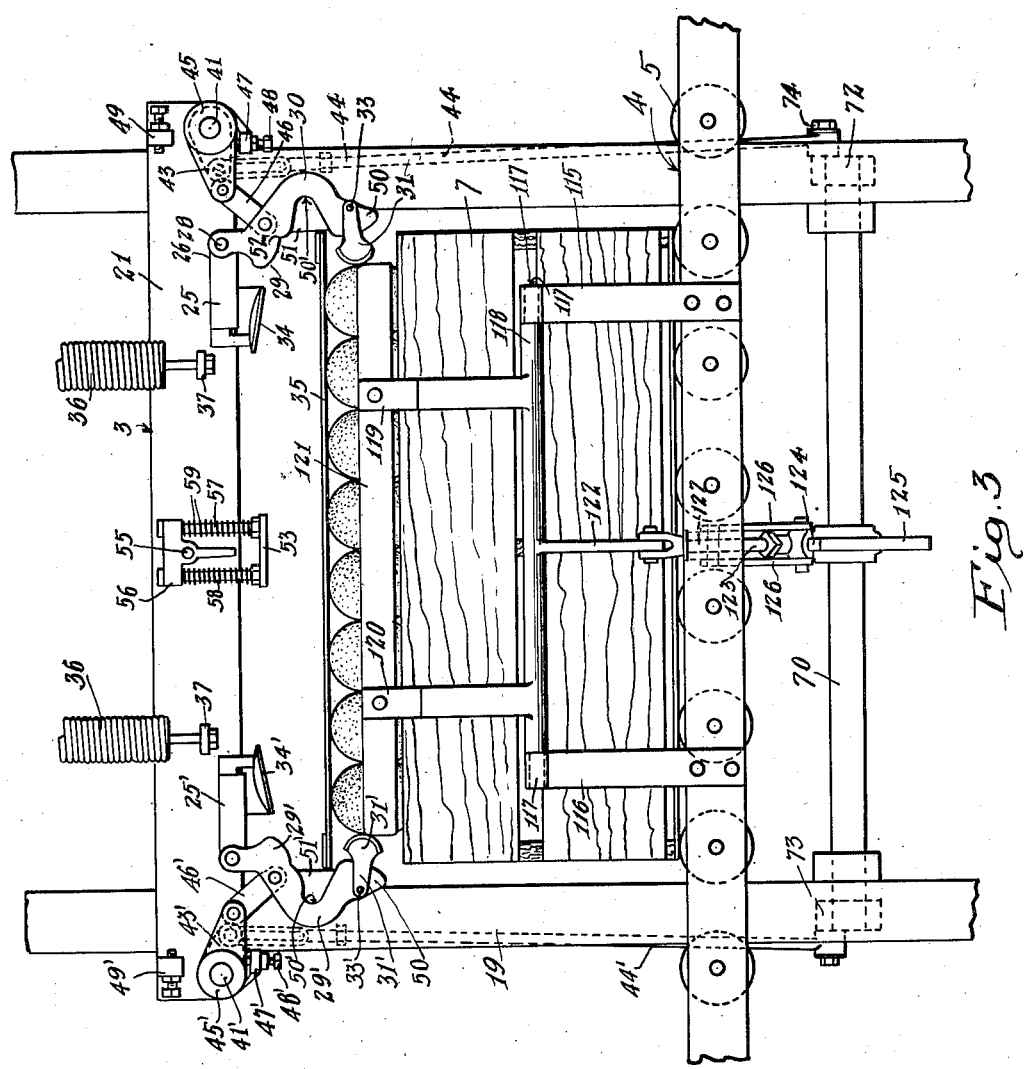
Fig. 3 is a detail front elevational view of a portion of the box lidding machine illustrating the press frame mechanism in its intermediate position and omitting certain of the parts for clarity.

By referring, particularly, to Figs. 1 and 3, it will be observed that the bracket 25 has secured to its underneath side a cover-engaging plate or press shoe 34 for the purpose of engaging the cover 35 which is to be placed upon the box and to press the same into contact with the upper edge of the box when the same is in a position ready to be nailed.

A similar bracket 25', carrying the press shoe 34' flusher 29' and tuckers 31' and 32', are secured near the opposite or left hand end of the cross bar 21 for the purpose of engaging the left hand end of the box lid 35 and for flushing the same and tucking in the contents of the box on this end of the box.

The press frame is normally supported in its uppermost position, as illustrated in Fig. 1, as by means of a plurality of tension springs 36 suitably secured as at 37 to the cross bar 21, the upper ends of these springs being secured as at 38 to a frame cross-tie 39 interconnecting the upper ends of the uprights 19 and 19'.

Referring again to Fig. 9, it will be observed that the extreme ends of the cross bar 21 are formed with forwardly and rearwardly extending bosses 40, constituting the bearing for a pin 41, to the rearward end of which is connected a crank arm 42, the arm of which extends inwardly toward the center of the machine. The end of the crank arm 42 is connected as at 43 to the upper end of the connecting rod 44 by which the press frame may be drawn downwardly into box-engaging position. The forward end of the pin 41 is rigidly connected to a crank arm 45 which, like crank 42, extends inwardly toward the center of the machine and has connected thereto a link 46 which interconnects the crank arm 45 with the flusher 29 so that as the connecting rod 44 is drawn downwardly to pull the press frame 3 to box-engaging position, the crank 45 will be rotated to swing the flusher 29 about its pivot 28 to insure the positioning of the end of the box cover flush with the end of the box 7.

Referring again to Fig. 3, it will be observed that the cross bar 21 is provided with a forwardly extending lug 47 positioned immediately below the crank 45 so as to constitute a limit stop for the downward movement of the crank 45 when the connecting rod 44 is moved downwardly. If desired, a suitable adjusting screw 48 may be threaded vertically through the lug 47 to permit of adjustment of the amount of movement permitted the crank 45. A similar, forwardly projecting lug 49 is arranged to engage the crank 45 when in its uppermost position to thereby limit the retractive movement permitted the crank.

Thus it will be observed that when the connecting rod 44 is drawn downwardly, the flusher 29 will be rotated to a position to insure proper positioning of the box cover 35 on the box and thence further movement of the connecting rod 44 will draw the press frame downwardly into engagement with the box cover 35 and press the same into tight engagement with the box 7 ready for nailing.

It frequently happens that the contents of the box to which the cover is to be secured extends slightly over the upper edges of the box so that as the cover 35 is pressed downwardly thereon the contents of the box may be pinched between the box end and the cover and thus injured. This is particularly true when the machine is to be employed for boxing fruits and vegetables, and for this reason I have provided the tucker 31, which will engage the contents of the box and press the same inwardly thereof immediately prior to bringing the box cover into position on the box.

Referring particularly to Fig. 3, it will be observed that in this figure the machine is illustrated in an intermediate position in which the connecting rods 44 have just been started downwardly but in which the press frame 3 has not yet been moved from its uppermost position.

It will be observed that the crank 45 has been rotated about the pin 41 from engagement with stop 49 into engagement with stop 47, thus swinging the flusher 29 to its inner position engaging the box cover 35 and centering the same immediately above the box 7.

It will be further observed that the tucker 31 has been carried by the flusher 29 to a position in which it extends inwardly of the end of the box so as to engage the contents which may extend over the end of the box and press the same inwardly thereof beyond the inner face of the box end.

It will be observed that the tucker 31 is normally held in a position at substantially right angles to the direction of extension of the flusher fingers 30 by means of abutment of the tucker upon a lug 50 so that when the flusher is moved to a position of alignment with the end of the box 7, the tucker 31 extends inwardly of the box to press the contents thereof to a position within the end boundary of the box.

Figure 4:
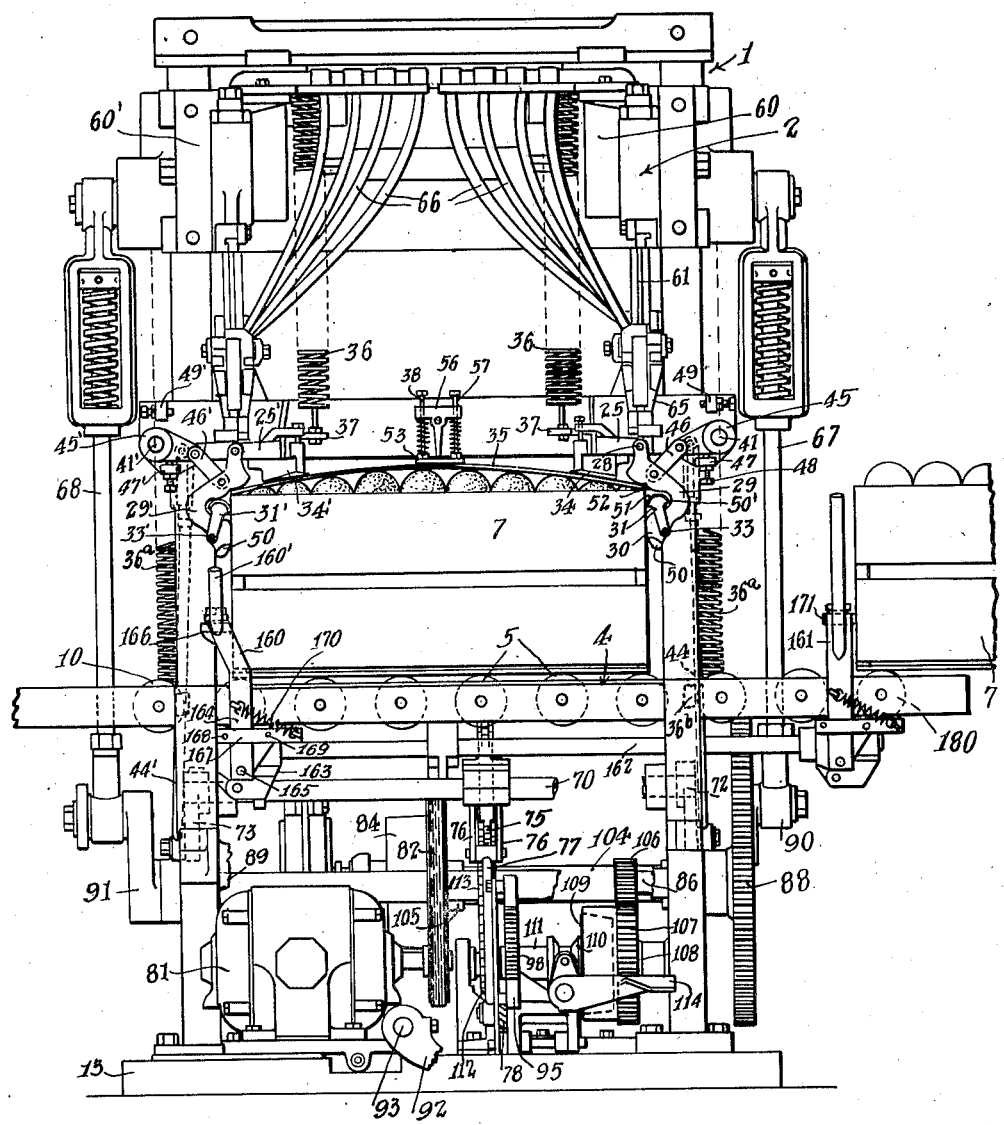
Fig. 4 is a front elevational view of the box lidding machine shown in Fig. 1, with the press frame in a further intermediate position, substantially ready for the descent of the nail driving devices, this figure omitting certain of the parts for clarity.

As the connecting rod 44 is drawn further downwardly the press frame 3 will be moved from the position illustrated in Figs. 1 and 3 to the position illustrated in Fig. 4. As the press frame 3 moves downwardly, the flusher 29 and the tucker 31 will also be drawn downwardly until the tucker 31 is engaged by the upper end of the box 7, so that further downward movement of the flusher 29 and the box end will rotate the tucker 31 about its pivot 33 until the tucker slides off of the end of the box.

By referring to Figs. 1, 3 and 4, it will be observed that the two end fingers 30 of the flusher are cut away as is indicated at 50' to form a recess into which the tucker 31 may pass as the tucker is rotated about its pivot 33 while the central finger of the flusher 29 is not so cut away and provides a relatively straight edge 51 which holds the end of the cover 35 in flush relation with the end of the box 7 during the entire downward movement of the press frame 3.

As the press frame 3, in its downward movement, approaches closely to the upper side of the box 7, the shoulders 52 formed near the inner end of the flusher 29 engage the edge of the cover 35 and press the same into secured relation with the upper edge of the box end, while the press shoes 34 will engage the box cover 35 at a point spaced inwardly of the end of the cover and insure pressing of this portion of the cover downwardly to prevent the box cover from being cracked as it is curved into position of engagement with the box.

When the machine is to be used for applying lids to a relatively long box, it is desirable to press the center of the box lid downwardly at the same time that the lid ends are pressed into engagement with the box and for this purpose a yieldable press shoe 53 may be provided near the center of the press frame 3.

By referring particularly to Fig. 9, it will be observed that the cross bar 21 is provided with a rearwardly extending boss 54 through which a shaft 55 extends toward the front of the machine. A pair of shoe frames 56 is illustrated as being pivotally secured in spaced relation along the shaft 55. Each of these frames 56 is illustrated as having the configuration of an upstanding T having a pair of rods 57 and 58 vertically slideable through the outer ends of the cross bar of the T, respectively. The rods 57 and 58 on each of the two frames 56 constitute four points of support to which an elongated press shoe 53 may be secured with a compression spring 59 surrounding each of the rods to normally press the shoe 53 downwardly, though permitting upward yielding motion of the press shoe as the frame 3 is moved downwardly into contact with the box lid 35.

The vertical leg of the T may be employed as a limit stop, limiting the yielding movement of the press shoe 53 to such amount of yield as is found most desirable.

Thus as the press frame 3 is drawn downwardly to the position illustrated in Fig. 4, the box cover will be securely held in position on the box 7 with the ends thereof securely engaging the ends of the box 7, so that the cover may be nailed to the box ends.

Referring again to Fig. 1, it will be observed that the nail driving head 2 is slideably mounted upon the uprights 19 in a position immediately above the press frame 3. The nail driving head 2 is substantially identical with the driving head illustrated in the patent to George D. Parker, No. 1,576,213, and a brief description thereof will suffice for purposes of understanding its operation in this application.

The nail driving head (Fig. 1) comprises essentially two frames 60 and 60', each of which carries a plurality of nail driving rods (Fig. 2), there being four of these rods 61, 62, 63 and 64 illustrated in the embodiment of the invention shown herein.

As will be understood by those skilled in the art, the lower ends of each of these driving rods 61 has secured thereto a nail chuck 65, to which nails may be fed through tubes 66 from a nail feeding mechanism, not shown.

The nail driving head 2 is illustrated as being normally supported upon the upper ends of a pair of connecting rods 67 and 68 (Figs. 1 and 2), one of which is provided at each of the right and left hand ends of the machine, respectively. Hence as the connecting rods 67 and 68 are moved downwardly the nail driving head will be drawn downwardly to such position as will engage the nail chucks 65 with the box lid or cover 35, after which further downward movement of the nail driving head 2 will cause the rods 61, etc., to press the nails in the chucks downwardly into and through the box lid into engagement with the box ends, thus securely nailing the box cover to the box.

The mechanism for moving the press frame 3 will next be described, this mechanism (see Figs. 2, 3 and 4) comprising an oscillatable shaft 70 extending longitudinally of the machine 1 and having rigidly secured to its opposite ends a pair of crank arms 72 and 73. The crank arm 72 is pivotally connected, as at 74, with the lower end of the connecting rod 44 which is employed to draw the right hand end of the press frame 3 downwardly while the crank arm 73 is similarly connected to the connecting rod 44' which is employed to draw downwardly the left hand end of the press frame 3.

The shaft 70 is illustrated as having a sprocket sector 75 rigidly secured thereto, which sector is connected through links 76 and 77 to a foot lever 78. The foot lever 78 is illustrated as being pivoted upon the base 13 as at 79 the opposite end of the lever 78 being provided with a foot pedal 80 which may be pressed downwardly by the foot of the operator or attendant of the machine when it is desired to bring the press frame into lid-engaging position.

Power means is provided for actuating the nail driving head 2, this means being illustrated as including a driving motor 81 secured in any suitable manner to the base plate 13 connected by means of a drive chain 82 to a sprocket 83 which is in turn connected through a clutch 84 to drive a jack shaft 86 which shaft extends longitudinally of the lidding and nailing machine 1 (see Fig. 4). Upon the right hand end of the jack shaft 86 is secured a pinion 87 which meshes with a spur gear 88 rigidly secured to a drive shaft 89. The gear 88 is provided with a crank pin 90 to which one end of the connecting rod 67 is attached, while a crank 91 secured to the left hand end of the drive shaft 89 connects with the connecting rod 68 attached to the nail driving head 2 so that upon rotation of the drive shaft 89 the connecting rods 67 and 68 will be first drawn downwardly to pull the nail driving head 2 into nail driving relation with the box 7, and then return to the position illustrated in Fig. 1.

The motor 81 is arranged to be driven continuously while the clutch 84 is provided for operatively connecting the motor to rotate the shaft 89 through its cycle of operations to draw the nail driving head 2 downwardly and return the same to its uppermost position, as is illustrated in Fig. 1.

The clutch 84 is illustrated as being controlled by means of a foot pedal 92 rigidly secured to a shaft 93 to which shaft is also secured a clutch operating yoke 94 which moves the clutch 84 into operative and inoperative positions.

Referring again to Fig. 2, it will be observed that the foot lever 78, which is employed to draw the press frame 3 to its lowermost position, is provided with means for holding the lever in its lower positions, this means comprising a pawl 95 pivotally mounted, as at 96, to the foot lever 78 and spring pressed by means of spring 97 into engagement with a ratchet 98 so that whenever the foot lever 78 is drawn downwardly the pawl 95 will engage the ratchet 98 and hold the same in whatever position the lever 78 has been moved.

As soon as the nail driving head 2 has been operated to drive the nails through the lid which has been pressed downwardly, the press frame, and hence the nail driving head, should be immediately lifted, and I have provided means for automatically releasing the press frame as soon as the nail driving head has performed its operation, as follows:

The ratchet 98 is pivoted as at 99 to the base plate 13 and is provided with a rearwardly extending arm 100 upon the end of which is secured a roller 101. The roller 101 is arranged to engage a cam 102 secured to the drive shaft 89 in such manner that the surface of the cam 102 will depress the arm 100 as soon as the nail driving head has reached its lowermost position and is starting its return upward movement. The depression of the arm 100 moves the ratchet 98 rearwardly out of engagement with the pawl 95 so that the lever 78 is released and the press frame is permitted to move upwardly under the influence of its springs 36.

Thus, while the press frame may be drawn downwardly, either manually or by power as will presently be explained and is locked in either operation, it is automatically released and restored to its uppermost position as soon as the nail driving operation is completed.

It will be observed (Fig. 5) that a spring 36a is provided for each of the connecting rods 44 and 44', one end of the spring 36a being connected to a block 36b secured to the connecting rod 44, while the other end of the spring is illustrated as being connected to the frame 14 at 36c so that as the press frame is lifted by its springs 36 the connecting rods 44 and 44' will be lifted by their springs 36a to insure reverse rotation of the crank 43 to its uppermost position, as illustrated in Fig. 1, thereby withdrawing the tuckers 31 and flusher 29 out of their original or normal position, as is illustrated in Fig. 1.

If, however, for any reason it is desired to release the press frame before the nail driving operation is performed, an auxiliary foot pedal 103 is provided as an extension of the pawl 95 so that by pressing the auxiliary pedal 103 the pawl 95 may be released from the ratchet 98 and the press frame will be lifted in substantially the same manner as though the ratchet 98 had been operated automatically. This manual release provided for lifting the press frame in the event that the contents of the box may become pinched between the cover and the box, or the failure of the box lid to be centered in correct position above the box.

It will be appreciated that considerable effort is required to depress the foot lever 78 to bring the press frame into engagement with the box lid and to then draw the box lid into secure position upon the box, and I have provided power means for operating the press frame, thus relieving the attendant of the necessity of manually actuating the frame.

Figure 5:
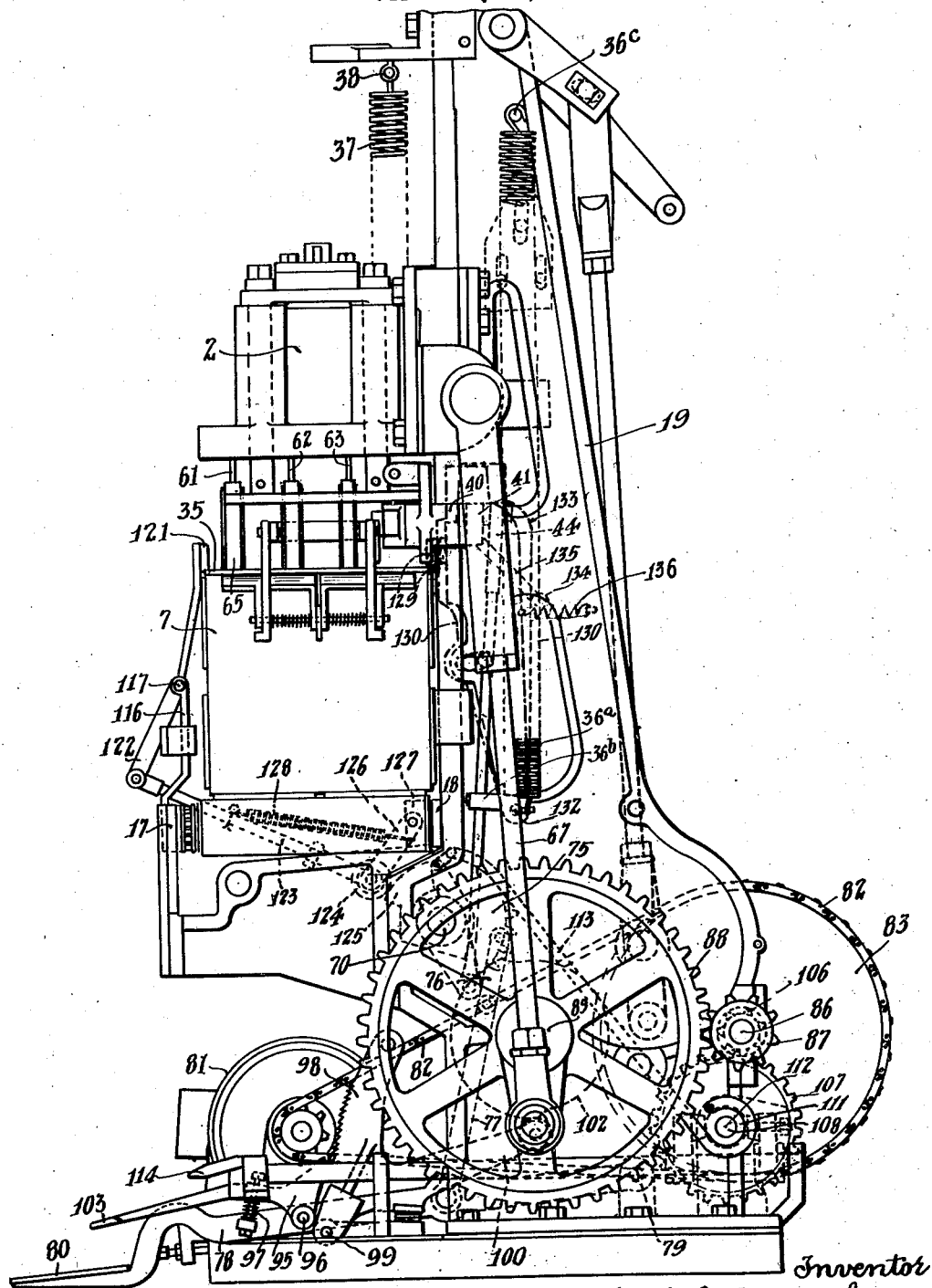
Fig. 5 is an end elevational view of the box lidding machine in the position shown in Fig. 4.

By referring particularly to Figs. 4 and 5, it will be observed that the jack shaft 86 is provided with an elongated sleeve 104 rotatable thereon, one end 105 of which is secured to the driving side of the clutch 84 so as to be continuously driven by the motor 81. The right hand end of the sleeve 104 has secured thereto a pinion 106 which meshes with a spur gear 107 mounted for rotation upon a stub shaft 108, the spur gear 107 being formed integrally with the driving member 109 of a clutch of which the driven member 110 is secured to a sleeve 111 also rotatable upon the shaft 108.

The sleeve 111 has rigidly secured thereto a sprocket 112 to which is secured one end of a chain 113, the opposite end of which extends over the sprocket sector 75 and is secured thereto. Thus when the clutch 109, 110 is engaged, power is supplied through the chain 113 to rotate the shaft 70 to which the connecting rods 44 and 44' are secured so that the press frame 3 is drawn downwardly in exactly the same manner as though the foot lever 78 had been operated.

It will be observed that when the shaft 70 is rotated by power, the foot lever 78 will move downwardly by gravity so that the ratchet and pawl 95, 96 will operate to hold the press frame in its lowermost position as was previously described for the foot operation of the lever 78.

Referring again to Fig. 4, it will be observed that the clutch 109, 110 is arranged to be engaged by manipulation of a suitable control pedal 114 so that the time of operation of the press frame 3 may be suitably controlled by the attendant or operator of the machine.

It will be observed, also, that the clutch 109—110, illustrated herein, is of the cone shape so that by varying the amount of pressure exerted upon the pedal 114, the amount of pressure which is exerted by the press frame may be accurately and sensitively controlled to prevent undue crushing of the contents of the box during the time that the lid is being pressed downwardly thereon. In other words, the attendant may carefully regulate the speed with which the press frame is brought downwardly and thus prevent injury to the contents of the box, a feature which is particularly desirable when the machine is used for boxing fruit and vegetables.

In addition to the tuckers 31, which are provided for pressing the fruit inwardly of the ends of the box 7, I have provided means for insuring against pinching of the contents of the box at the sides thereof by providing a tucker at both the front and rear of the box, while it is in nailing position in the machine. By referring particularly to Figs. 1, 2, 3 and 5, it will be observed that a pair of upstanding brackets 115, 116 are secured to the longitudinally extending bar 17 in spaced relation to each other, the upper end of each of these brackets being formed with an eye 117 constituting a trunnion bearing for a longitudinally extending bar 118, having a pair of upstanding arms 119 and 120 formed integrally therewith, these arms being interconnected at their upper ends by means of a front tucker bar 121, which bar is constructed to extend substantially across the length of the box 7 to be operated upon in the nailing machine.

The bar 118 is further provided with a downwardly extending arm 122 to which is secured one end of a link 123 the opposite end of which bears a roller 124 arranged to engage a cam 125 rigidly connected to jack shaft 70.

The lower end of the link 123 is suspended above the cam 125 as by means of a pair of short links 126 pivotally connected to an outstanding block 127 secured to the inner table rail bar 18 while a spring 128 interconnecting the block 127 and the link 123 normally presses the link into engaging relation with the cam 125.

Figure 2:
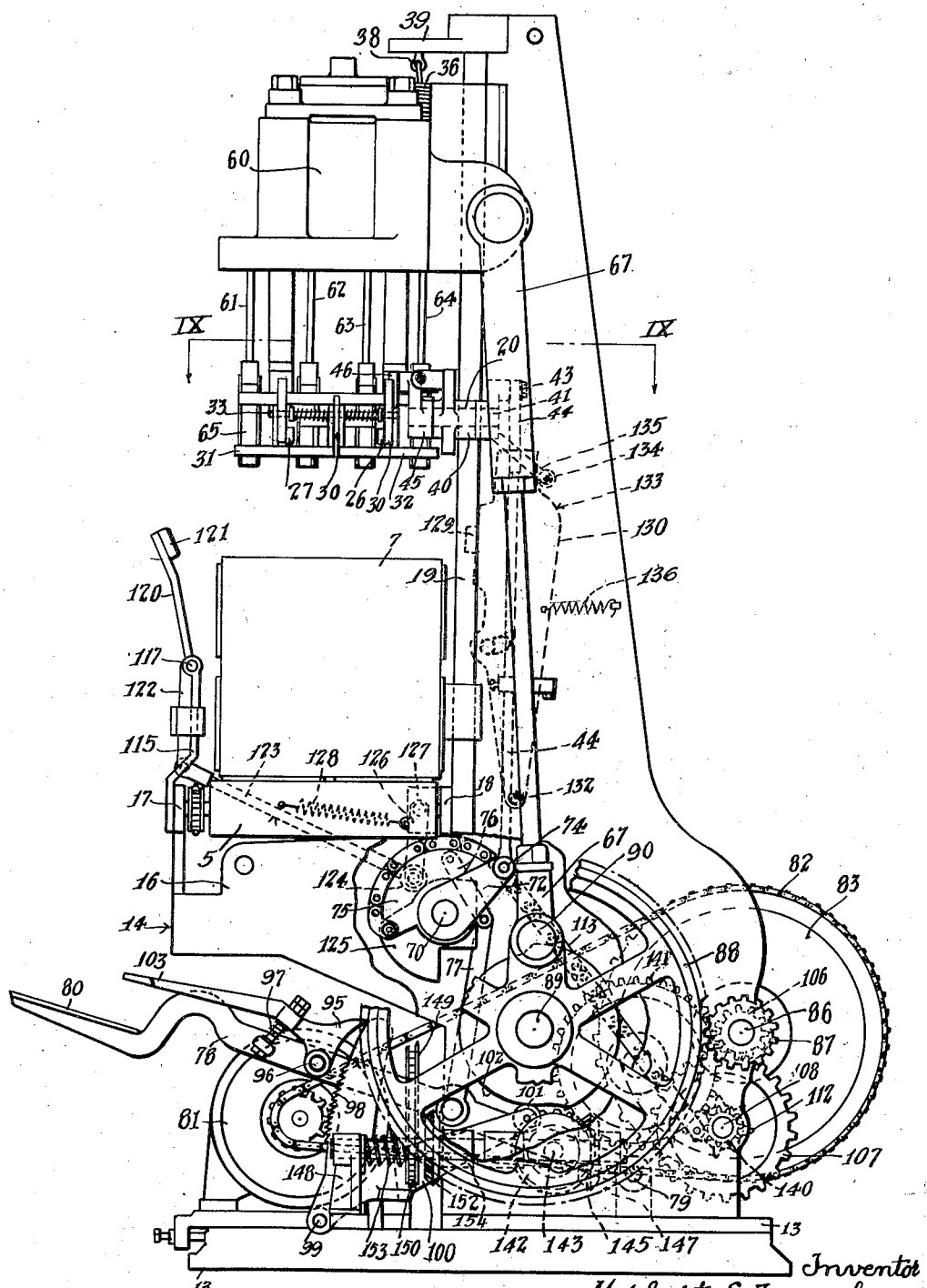
Fig. 2 is a side elevational view of the box lidding machine illustrated in Fig. 1.

By properly selecting the contour of the cam 125 the front tucker bar 121 will be moved inwardly upon the initial movement of the shaft 70 which draws the press frame 3 downwardly so that the contents of the box which may be extending over the front side of the box, will be pressed inwardly flush with the inner face of the front side of the box prior to the drawing down of the press frame to press the lid 35 into engagement with the box. Thus as the press frame draws the lid downwardly the contents of the box will be pressed downwardly without danger of pinching the same against the upper edge of the box side while when the press frame is released and is restored to its uppermost position, the cam 125 will be rotated in the opposite direction to allow the tucker bar 121 to move to its outward position, as illustrated in Fig. 2, ready for the next operation.

The rear tucker bar is indicated by the reference character 129, this bar being similar to bar 121 but having its opposite ends connected to a pair of frames 130 and 131, respectively, at the right and left hand ends of the machine.

The frame 130 is illustrated as being pivoted at 132 on the inner side of the upright 19. The rear surface of the frame 130 is provided with a cam surface 133 adapted to be engaged by a roller 134 secured to a rearwardly extending arm 135 secured to the press frame 3, and movable therewith so that as the press frame 3 is drawn downwardly, the roller 134 engages the cam surface 133 and swings the frame 130 forwardly about its pivot 132 to the position shown in dot-dash lines in Fig. 5, thus bringing the rear tucker 129 into position to press the contents of the box 7 inwardly of the rear side thereof.

When the press frame 3 is again lifted, the movement of the roller 134 upwardly over the cam surface 133 permits the frame 130 to be retracted as by means of a tension spring 136 secured between the frame and some stationary portion of the machine. It will be observed that the cam surface 133 is arranged in such position upon the frame 130 that the frame is moved by the initial downward movement of the press frame, insuring that the contents of the box will be pressed inwardly before the lid is pressed downwardly to a position of possible injury to the contents.

In the operation of prior nail driving machines, it has been the practice to feed boxes of fruit or other articles to the nail driving machine, and these machines require that the attendant or operator of the nail driving machine manually place the boxes in nailing position therein and manually remove the boxes from nailing position after the nailing operation occurred. I have devised an automatic feeding mechanism which may be employed to automatically move the boxes into nailing position upon the machine and to remove the boxes therefrom, the mechanism interrupting its operation during the pressing and nailing cycles of the machine.

As hereinbefore described, the nailing table 4, upon which the boxes 7 rest during the pressing and nailing operations, comprises a roller conveyer in which the rollers 5 are power driven by means of a chain 6 to automatically move the boxes through the machine.

Figure 8:
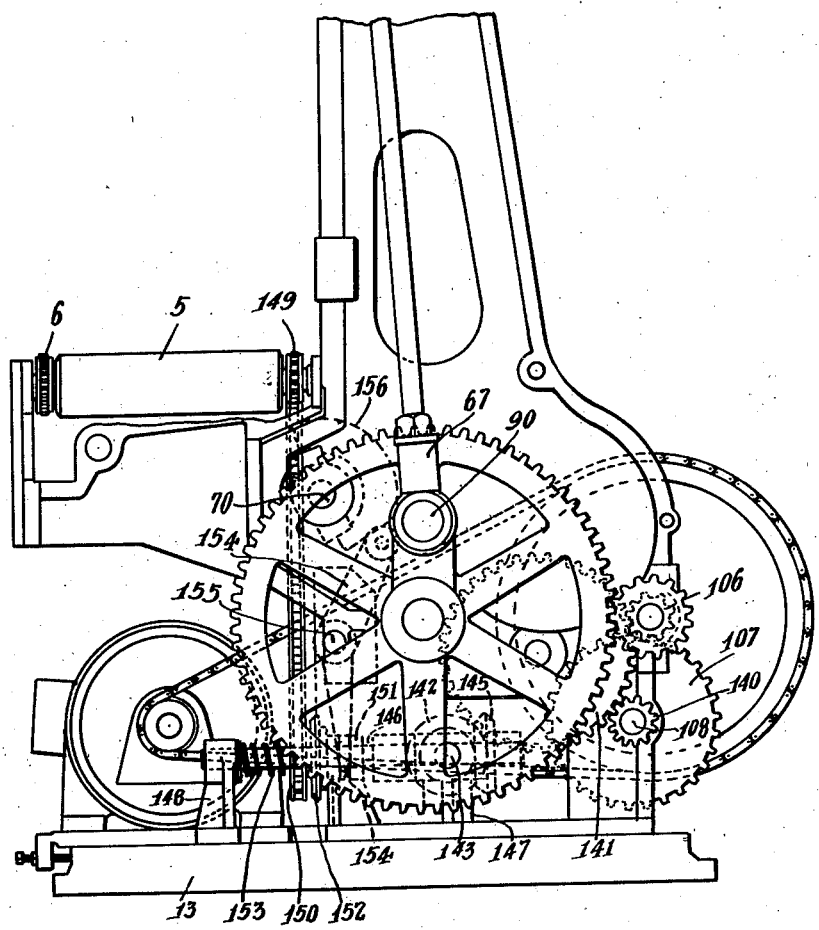
Fig. 8 is a detail end view of the box lidding and nailing machine illustrating the driving mechanism for the conveyor between the box lidding and strapping machines.

By referring particularly to Figs. 1 and 8, it will be observed that the spur gear 107, which is continuously driven by pinion 106, has formed integrally therewith a pinion 140 which is in turn connected through an idler gear 141 to a pinion 142 mounted upon a stub shaft 143.

Referring again to Fig. 1, it will be observed that pinion 142 has formed upon one of its ends a mitre gear 144, which meshes with a similar mitre gear 145 keyed to a shaft 146 which extends laterally of the machine in suitable bearings 147 and 148 secured to the base 13 of the machine.

The mitre gears 144 and 145 constitute a power take-off for driving the rollers 5 by connecting one of the rollers 5 through a chain 149 to a sprocket 150 which is secured to a sleeve 151 which in turn is connected to the drive end of a clutch 152. The drive end of the clutch 152 is connected rigidly to the shaft 146 so that when the clutch is engaged, power is transmitted through the chain 149 to the roller 5 and thence to the chain 6 through which power may be supplied to all of the rollers constituting the nailing table of the machine.

The clutch 152 is illustrated as normally spring pressed, as by spring 153 into engaged position, but is arranged to be disengaged through the operation of a lever 154 pivoted at 155 to some stationary portion of the machine and arranged to be actuated by means of a cam 156 rigidly secured to shaft 70 so that as the shaft 70 is revolved to start the press frame downwardly, the cam 156 actuates the lever 154 to disengage the clutch and to hold the same disengaged until the press frame is restored to its uppermost position. In other words, the rollers 5 are power driven to bring the boxes 7 into the machine 1 but these rollers are stopped during the entire cycle of operations of the lowering of the press frame and nailing of the lid to the box.

By stopping the rollers during the pressing and nailing operations, the friction which would otherwise occur between the rollers and the boxes is avoided, and further a saving in power is accomplished, since during the time when high resistance is offered to the movement of the boxes, no power is applied to the rollers tending to move the boxes.

In order to insure that the boxes when moved by power into the machine 1 will stop in the correct position for lidding and nailing, I have provided automatically operating stop devices 160 and 161, the operation of which will be synchronized with the operations of the lidding and nailing machine.

Figure 6:
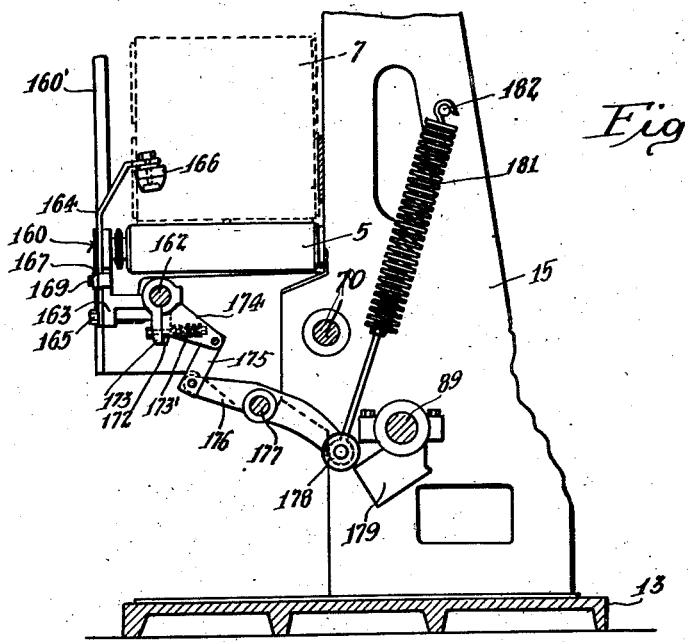
Fig. 6 is a detail sectional view, taken along line VI—VI of Fig. 1, illustrating the operation of the box stopping devices.
Figure 7:
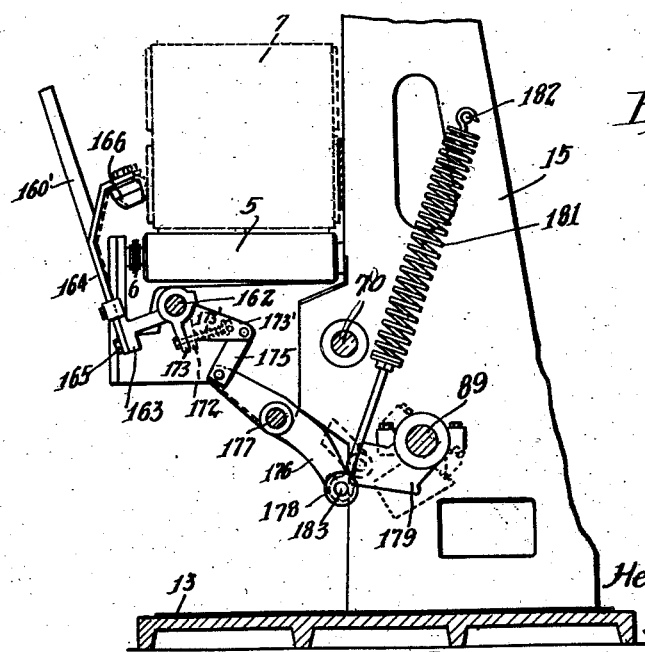
Fig. 7 is a detail sectional view similar to Fig. 6, showing the box stopping devices in retracted postion.

By referring particularly to Figs. 1, 6 and 7, it will be observed that a rocker shaft 162 extends longitudinally of the machine 1 and has secured near its left hand end a forwardly extending bracket 163, the outer end of which is substantially T-shaped and has a bar 164 extending upwardly across the face of the T, the bar being pivoted to the face of the T as at 165. The upper end of the bar 164 is bent inwardly and bears upon its end a roller 166 adapted to engage the front end of a box when the bar is moved inwardly by the rocker shaft 162.

Referring again to Fig. 1, it will be observed that the front face of the bracket 163 is provided with a strap 167 which extends longitudinally in front of the bar 164, the strap 167 being secured to the bracket as by means of pins 168 and 169 so that the bar 164 is permitted a limited lateral movement on the face of the bracket 163, this movement limited by the pins 168 and 169.

A spring 170 normally holds the bar in its right hand position (the position illustrated in Fig. 1), ready to engage the end of a box 7 as it is passed into the machine. A similar construction is provided upon the right hand end of the rocker shaft 162 for mounting a roller 171 constituting the box engaging element of the automatic stopping device 161.

By referring particularly to Figs. 1 and 6, it will be observed that the inner end of the bracket 163 is provided with a downwardly depending ear 172 arranged to be engaged by a similar ear 173 formed upon a bracket 174 which also is pivoted upon the shaft 162. The end of the bracket 174 is connected by means of a link 175 to a rocker arm 176 pivoted upon a stub shaft 177 secured to the end frame 15. The rocker arm 176 extends inwardly and downwardly relative to the machine and has a roller 178 mounted thereon for engagement by a cam 179 rigidly secured to the main drive shaft 89, whenever the shaft 89 is rotated to the nail driving position.

Fig. 6 represents the position of the rocker arm and cam when the shaft 89 is in the position holding the nail driving head 2 in elevated position while Fig. 7 illustrates the position of the cam 179 and the rocker arm 176 when the shaft 89 has been rotated to draw downwardly the nail driving head 2 and has just completed the nail driving operation so that the nail driving head is now on its way back to its lifted position.

Thus, as soon as the nail driving operation has been completed, the cam 179 will operate the rocker arm 176 to rotate the shaft 162 and thereby move the stop roller 166 to the position illustrated in Fig. 7. The movement of the stop roller 166 will release that box 7 which has been in the nail driving position to permit it to move toward the left as viewed in Fig. 1.

It will be observed that the arrangement of the cam 156 which operates the conveyor clutch 152 is so coordinated with the cam 179 that at the instant the stop roller 166 releases the box the clutch 152 is thrown into engagement to apply power to the rollers 5 of the conveyor, thus starting the box 7 on its movement toward the strapping machine 11.

At the same time, it will be observed that the rotation of the shaft 162 causes the right hand stop 161 to be swung forwardly of the machine to release the next succeeding box 7, which prior to this time has been held stationary just ready to enter the nailing machine at the end of the feeder conveyor 8. Thus, the release of the stop 161 permits the next succeeding box 7 to be moved into the nailing machine, it being understood that when the next succeeding box 7 is held stationary by the stop 161 its front end rests upon the first roller 180 constituting one of the power driven rollers 5 of the nailing machine 1.

It will be further observed that the usual arrangement of the feeder conveyor 8 is such that the boxes arrive at the nailing machine, one immediately behind the other with the ends of one box abutting the end of its predecessor. Hence, the speed of operation of the rollers 5 should exceed the speed of operation of the feeder conveyor 8 to thus separate the first box of the line on the feeder conveyor from its successors to thereby permit the roller 171 to enter into the space so provided and thus be ready to catch and hold the successor.

By referring again to Fig. 7, it will be observed that the actual time during which the cam 179 holds the stops 166 and 171 out of box-engaging position is relatively small so that almost instantly, the rollers are permitted to drop back to positions shown in Fig. 6. However, it will be observed that the inward movement of the stop rollers 166 and 171 is controlled by a biasing spring 181, one end of which is secured as at 182 to the frame 15 while the other end of the spring is secured to the inner end 183 of the rocker arm 176 so that though the roller 166 may engage the side of the box which is just passing out of engagement therewith, the spring 181 will bias the roller to drop into its innermost position as soon as the box passes beyond the roller 166.

It will be observed that the depending ears 172 and 173 are held in close relation to each other by means of a spring 173' so that if the roller 166 engages the side of the box 7 and is held against returning to the position shown in Fig. 6, the ears 172, 173 may separate ready to be drawn back to their engaged position as soon as the box passes beyond the roller 166. In this manner, provision is made for manually removing the roller 166 out of the way of the box when such operation is desired, the attendant merely grasping the handle 160' and pulling the roller 166 forwardly out of engaging position with the box.

When the rollers 166 and 171 are moved outwardly, the spring 170 (one of which is associated with each of the stops) moves the arm 164 to the right as viewed in Fig. 1, thus, though there may be but an instantaneous outward movement of the roller 166, the effect will be to move the roller around the corner of the box and thus prevent its returning into position in front of the box 7 or in the case of the stop roller 171 to prevent it from again moving into position in front of the succeeding box. However, when the succeeding box 7 has moved into nailing position it will engage the roller 166 and move the arm 164 back to its extreme left hand position, thus stopping and holding the box in the proper position for receiving the lid upon the next operation of the lidding machine 1.

The box 7, which has just been lidded is moved by the conveyor rollers 5 into engagement with the roller 10 and is then moved into proper position on the strapping machine 11 ready to receive a strap which crosses the center of the box lid.

In view of the fact that the detail construction of the strapping machine is disclosed in the previously referred to patents to George D. Parker, No. 1,715,780, 1,739,085 and 1,777,474, detailed description of the same will not be repeated herein except to point out that the strapping machine is operated by means of a constantly operating driving motor 185 engaged to operate the strapping machine through a clutch 186 which is in turn operated by a clutch yoke 187 connected through a rod 188' to a foot pedal 188. Thus, upon the attendant's stepping upon the pedal 188, the strapping machine places the strap in proper position upon the box located upon the bed 12 of that machine.

The operation of the strapping machine 11 may be automatically controlled and its movements may be coordinated with the movements of the lidding machine 1 to avoid the necessity of the attendant having to leave the machine 1 to operate the pedal 188. This automatic operation comprises a secondary pedal 189 free to turn upon the same shaft 190 upon which the pedal 188 turns and is connected by a rod 189' to also operate the clutch yoke 187 so that operation of the auxiliary pedal 189 has the same effect as though the pedal 188 had been operated.

The pedal 189 is arranged in the path of a roller 191 secured to the end of the crank pin 192 constituting a part of crank 91 which operates the left hand end of the nail driving head 2. Hence when the crank 91 is operating in the nail driving operation upon that box 7 which is in nailing position, the clutch operating pedal 189 will cause the strapping machine 11 to apply the strap to the previously lidded box.

The general operation of my machine is as follows:

Boxes of fruit 7, approaching the machine on the feeder conveyor 8, are stopped with their front ends just resting upon the roller 180 constituting a part of the power driven rollers 5 on the lidding and nailing machine 1, by means of the abutment of the first of the boxes against the stop 161.

Assuming that the operator of the combined lidding and strapping machine operates the lidding machine through one cycle of its operations, the rotation of shaft 70 as a consequence of such operation will operate the clutch 145 (Fig. 8) to apply power to the rollers 5 and 180 while at the same time cam 179 (Fig. 7) will actuate the stop 161 (Fig. 1) to release the first box entering from feeder conveyor 8 and this box will be moved into nailing position upon the machine 1 at a speed greater than the speed with which succeeding boxes are fed from the feeder conveyor 8.

The first box to enter the machine 1 will abut the left hand stop 160 and be brought to rest in proper position for lidding and nailing.

The operator will then place the lid 35 upon that box and will then operate pedal 114 (see Fig. 4), to actuate clutch 109, 110 to thereby rotate shaft 70 to draw the press frame 3 downwardly to press the cover 35 into nailing position upon the box.

As hereinbefore described, the initial downward movement of the connecting rods 44 will move the end tuckers 31 and 32 and 31' and 32' inwardly toward the fruit to press any outstanding fruit within the boundaries of the box so that the same will not be crushed or pinched as the cover 35 is pressed downwardly thereon.

At the same time, initial movement of the connecting rods 44 will be accompanied by the actuation of the front tucker 121 by means of its cam 125 so that any fruit overlapping the front of the box will be pressed inwardly between the boundaries of the box. In like manner the initial downward movement of the press frame 3 will cause the rear tucker 129 to be moved inwardly through the actuation of the cam-like frame 130 by its operating roller 134 to thus press any fruit overlapping the rear of the box inwardly within the boundaries of the box.

Further downward movement of the press frame 3 will engage press-shoes 34, 34' and 53 with the cover 35 of the box and press the same into box-engaging position. While this latter pressing movement is being performed the downward movement of the tuckers 31 and 32 with the flusher bar 29 will cause the tuckers 31 and 32 to engage the upper edge of the end of the box so that the tuckers 31 will be folded back into the space 50 on the flusher while the flusher 29 will abut the ends of both the box 7 and the cover 35 to insure that the end of the box and the end of the cover will be in flush relation ready for nailing.

While the press frame 3 is in its lower position, as indicated in Fig. 4, it will be held there by reason of the ratchet and pawl 96—95. Then the operator may press the nailing pedal 92 to operate clutch 84 to thus rotate shaft 89 to draw the nailing frame 60 and 60' downwardly to apply the nails to the box and box cover.

The rotation of shaft 89 in drawing the nailing frame 60—60' to its extreme downward position, will cause cam 102 to operate the pawl and ratchet mechanism 96—95 to release the press frame so that the press frame will follow the upward movement of the nailing frame 60—60', while at the same time cam 179 will operate to release stops 160 and 161. As the press frame moves upwardly the rotation of shaft 70 will operate cam 156 to move clutch 145 back into engaged position, thus applying power to rollers 5 to move the free box which has been lidded out of its position in the nailing machine while the second box in line will be moved into nailing position.

It will be observed that power is continued to be applied to the rollers 5 during the entire time that the press frame 3 is in its upper or retracted position, hence the box which has just been lidded will continue to move toward the strapping machine until it arrives in proper position for applying the strap, at which point a releasable stop 200 on the strapping machine will engage and hold the same in strapping position.

The second box which moves into nailing position on the lidding machine will have the same cycle of operation performed upon it and the downward movement of the nailing frames 60—61' will be accompanied by a contact between the roller 191 on the crank 91 and the clutch operating pedal 189 which will apply power to the strapping machine and thus apply the strap to that box which has previously been lidded.

As will be understood from an inspection of the George D. Parker Patents Nos. 1,715,780, 1,739,085 and 1,777,474, the operation of the strapping machine automatically releases the stop 200 to release the strapped box and permit it to be pushed out of the way by the second box which moves from the lidding machine into the position upon the strapping machine.

It will therefore be observed that I have provided a lidding and strapping machine in which the boxes are fed into proper positions upon the machines automatically without the necessity of the attendant or operator of the machine manually moving the same into position. Further, the work to be performed by the attendant is reduced to merely the placing of the lid upon the box and the manipulation of the two pedals 114 and 92 which are both located upon the lidding machine and readily accessible to him while he is in position in front of the machine necessary to place the lids upon the boxes. Thus the work required to lid and strap the boxes is materially reduced.

Moreover, automatically operating tuckers and flushers are provided which operate synchronously with the operations of the lid securing devices (the press frame and/or nail chucks and nail driving mechanism) to insure against crushing or pinching of the fruit in the boxes.

While I have shown and described the preferred embodiment of my invention, I do not desire to be limited to any of the details shown or described herein, except as defined in the appended claims.

I claim:

1. In a combined lidding and strapping machine, a lidding machine and a strapping machine located in alignment with each other, a feeder conveyor aligned with the lidding machine for feeding boxes to said machine, a conveyor constituting the nailing table of said machine, power means for operating said conveyor to move said boxes into said nailing machine and to said strapping machine, means operable upon the movement of said lidding machine to apply pressure to said boxes for disconnecting said power means to stop said conveyor during the nailing operation, and means operable by actuation of said lidding machine to secure the lid upon a box for actuating the strapping machine to apply a strap to a box.

2. In a combined lidding and strapping machine, a lidding machine including a reciprocating nailing head for nailing a lid to a box, power means for operating said nailing head from a normally retracted position to a nailing position and back to said retracted position including a power-driven shaft and a crank thereon, a strapping machine aligned with said lidding machine for receiving lidded boxes from said lidding machine, power means for actuating said strapping machine to apply a strap to said lidded boxes including a normally released clutch connecting said power means and said strapping machine, and means on the crank of said lidding machine for actuating said clutch when said nailing head is moved to nailing position.

3. In a box lidding and nailing machine, a nailing table for supporting boxes to be lidded, a press frame reciprocably mounted above said table for engaging and pressing box lids into nailing position upon said boxes, a nailing head reciprocably mounted above said nailing table for nailing lids to said boxes, power means for reciprocating said nailing head, manually operable means for moving said press frame downwardly into lid-pressing position, and means including a clutch for connecting said nailing head power means to said press frame operating means to move said press frame downwardly by power.

4. In a box lidding and nailing machine, a nailing table for supporting boxes to be lidded, a press frame reciprocably mounted above said table for engaging and pressing box lids into nailing position upon said boxes, a nailing head reciprocably mounted above said nailing table for nailing lids to said boxes, power means for reciprocating said nailing head, manually operable means for moving said press frame downwardly into lid pressing position, means including a clutch for connecting said nailing head power means to said press frame operating means to move said press frame downwardly by power, means for holding said press frame in the downward position, and means operable by the downward movement of said nailing head for releasing said holding means.

5. In a box lidding and nailing machine, a nailing table for supporting boxes to be lidded, a press frame reciprocably mounted above said table for engaging and pressing box lids into nailing position upon said boxes, a nailing head reciprocably mounted above said nailing table for nailing lids to said boxes, power means for reciprocating said nailing head, manually operable means for moving said press frame downwardly into lid pressing position, means including a clutch for connecting said nailing head power means to said press frame operating means to move said press frame downwardly by power, and means for moving said press frame upwardly.

6. In a box lidding and nailing machine, a nailing table for supporting boxes to be lidded, a press frame reciprocably mounted above said table for engaging and pressing box lids into a nailing position upon said boxes, a nailing head reciprocably mounted above said nailing table for nailing lids to said boxes, power means for reciprocating said nailing head, manually operable means for moving said press frame downwardly into lid pressing position including a rotatable shaft, connecting rods interconnecting said shaft and said press frame and a foot lever connected to said shaft to rotate the same, a clutch and gearing interconnecting said nailing head power means to said rotatable shaft to rotate the same independent of movement of said nailing head, and a second clutch for connecting said power means to said nailing head for operating the same.

7. In a box lidding and nailing machine, a nailing table, a reciprocating nailing head above said table for nailing lids to boxes, a press frame reciprocably mounted above said nailing table for pressing lids into nailing position upon said boxes, means for moving said press frame into lid pressing position, an end tucker carried by said press frame and movable upon the initial movement of said press frame operating means into a position between the lid and the box to press overhanging contents to positions within the end boundary of said box.

8. In a box lidding and nailing machine, a nailing table, a reciprocating nailing head above said table for nailing lids to boxes, a press frame reciprocably mounted above said nailing table for pressing lids into nailing position upon said boxes, means for moving said press frame into lid pressing position, an end tucker carried by said press frame and movable upon the initial movement of said press frame operating means into a position between the lid and the box to press overhanging contents to positions within the end boundary of said box, and means interconnecting said tucker and said press frame whereby engagement of said tucker by said box as the press frame moves toward the box will move said tucker outwardly to clear the box.

9. In a box lidding and nailing machine, a nailing table for supporting boxes to be lidded, a press frame for pressing lids into position upon boxes, means for mounting said press frame for reciprocation above said nailing table, a flusher secured to said press frame for aligning the end of the box and the end of a lid, a tucker bar pivotally mounted upon said flusher for engaging and pressing the contents of the box inwardly when said flusher is engaged by the lid, said tucker being movable about its pivot when engaged by the box to swing the tucker out of alignment with the box when said press frame is drawn downwardly to press the lid on the box.

10. In a box lidding and nailing machine, a nailing table for supporting boxes in position to be nailed, a press frame reciprocably mounted above said nailing table to press lids upon said boxes into nailing position, a flusher pivotally mounted upon said press frame and reciprocably therewith, means normally holding said flusher in an extended position out of alignment with a box to be nailed, means for drawing said press frame downwardly to press a lid upon said box, means connecting said press frame drawing means to said flusher to move said flusher inwardly upon the initial movement of said press frame drawing means, a tucker pivotally secured upon the outer end of said flusher, extending inwardly of said flusher when said flusher is in its inner position to press the contents of the box within the end boundary of the box and engageable with the upper edge of the box when said press frame is drawn downwardly to move said tucker about its pivot to a position outside the end boundary of said box.

11. In a box lidding and nailing machine, a nailing table for supporting boxes in position to be nailed, a press frame for pressing lids into nailing position upon said box, means mounting said press frame for reciprocation toward and away from said nailing table, means for moving said press frame toward said nailing table, including a connecting rod, a crank rotatable in said press frame connected to said connecting rod, stop means on said press frame for limiting the rotary movement of said crank, a flusher pivotally connected to said press frame and movable by rotation of said crank into a position of alignment with a box to be nailed, and a tucker bar pivotally mounted upon said flusher and normally extending inwardly of said flusher for engaging and pressing contents of a box within the end boundary of said box when said flusher is in alignment with the end of said box.

12. In a box lidding and nailing machine, a nailing table for supporting boxes in position to be nailed, a press frame mounted above said nailing table, driving means for producing relative movement between said nailing table and said press frame toward and away from each other to press a lid into nailing position upon said box, a front tucker on said machine extending substantially the length of said box, means pivotally mounting said tucker for movement toward and away from said box, a pair of end tuckers carried respectively by the ends of said press frame and movable into a position between said lid and said box, and means operably responsive to actuation of said driving means for moving said end tuckers and said front tucker toward said box to press the contents of said box within the boundaries of said box.

13. In a machine for securing lids to boxes, a table for supporting a box during the lid securing operation, said table comprising a conveyor for moving boxes into and through said machine, power means for driving said conveyor, a clutch connecting said power means to said conveyor, lid engaging means reciprocably mounted above said table for movement toward and away from said table to engage and press lids upon boxes, operating means for moving said lid engaging means, and means operably responsive to the movement of said operating means to move the lid engaging means toward said table, for disengaging said clutch.

14. In a machine for securing lids to boxes, a table for supporting a box during the lid securing operation, said table comprising a conveyor for moving boxes into and through said machine, power means for driving said conveyor, a clutch connecting said power means to said conveyor, lid engaging means mounted above said table for engaging and pressing lids upon boxes, means mounting said table and said lid engaging means for relative movement toward and away from each other to apply pressure to said lids and to release pressure from said lids, and means operably responsive to relative movement of said table and lid engaging means toward each other for disengaging said clutch means and operable by relative movement of said lid engaging means and said table away from each other for reengaging said clutch.

15. In a box lidding and nailing machine, a nailing table therefor comprising a conveyor for moving boxes into and through said machine, power means for driving said conveyor, a clutch for connecting said power means to said conveyor, lid engaging means reciprocably mounted above said nailing table for movement toward and away from said table to engage and press lids upon boxes, and means operably responsive to movement of said lid engaging means toward said table for disengaging said clutch.

16. In a box lidding and nailing machine, a nailing table therefor comprising a conveyor for moving boxes into and through said machine, power means for driving said conveyor, a clutch for connecting said power means to said conveyor, lid engaging means reciprocably mounted above said nailing table for movement toward and away from said table to engage and press lids upon boxes, and means operably responsive to movement of said lid engaging means toward said table for disengaging said clutch to stop said conveyor, stop means in the path of movement of boxes on said conveyor, and means operably responsive to movement of said lid engaging means away from said table for moving said stop means out of the path of boxes.

17. In a box lidding and nailing machine, a nailing table for supporting boxes in position to be nailed, a press frame reciprocably mounted above said nailing table for movement toward and away from said nailing table to press a lid into nailing position upon said box, means for moving said press frame toward said nailing table including a rotatable shaft, a front tucker extending substantially the length of a box, means pivotally mounting said tucker for movement toward and away from said box, and a cam rotatable with said shaft for moving said tucker toward said box when said shaft is rotated to move said press frame downwardly towards said table.

18. In a lidding and nailing machine, a nailing table for supporting boxes in nailing position, said nailing table comprising a plurality of conveyor rollers, power means for driving said rollers to move said boxes into and out of said machine and including a clutch normally connecting said power means to said rollers, a reciprocating press frame, means for moving said press frame downwardly toward said nailing table to press lids into nailing position upon said boxes including a rotatable shaft, and cam means associated with said shaft for disconnecting said clutch when said press frame is moved into pressing position.

19. In a machine for applying lids to boxes, wherein the contents protrude above the top level of the box, means for pressing a lid over the protruding contents of said box and into nailing engagement with the ends of said box, an end tucker insertable between the lid and the box to press the protruding contents inwardly of the end boundary of the box, means mounting said tucker on said lid pressing means and operable by movement of said pressing means toward a box for withdrawing said tucker before said lid is pressed into contact with said box ends.

20. In a box lidding and nailing machine, a nailing table for supporting boxes to be lidded, pressing means for pressing a lid into position upon the ends of a box, means for producing relative vertical movement between said lid pressing means and said nailing table toward each other to press lids upon boxes, an end tucker carried by said machine for entry between the lid and the end of said box to engage and press the contents of said box within the end boundary thereof, and movable to a position outside of the end boundary of said box by relative movement of said pressing means and said box toward each other.

21. In a box lidding and nailing machine, a nailing table for supporting boxes to be lidded, pressing means for pressing lids into position upon boxes, means mounting said pressing means and said nailing table for relative movement toward and away from each other, a tucker bar pivotally secured to said pressing means for engaging and pressing the contents of said box inwardly of the end of said box, said tucker being movable about a pivot when engaged by the box to move the tucker out of alinement with the end of said box when the pressing means and the nailing table are moved relative to each other toward each other to press the lid upon said box.

22. In a box lidding and nailing machine, a nailing table for supporting boxes to be lidded, means for pressing a lid into engagement with the ends of the box, means mounting said pressing means and said nailing table for relative movement toward and away from each other, an end tucker for entry between the lid and the end of the box to engage and press the contents of the box within the end boundary of the box as said nailing table and said pressing means are relatively moved toward each other, and means mounting said tucker for engagement by said box end to allow movement of said tucker to a position outside the box end immediately prior to the engagement of the lid with the end of the box.

23. In a box lidding and nailing machine, a nailing table for supporting boxes to be lidded, pressing means for pressing a lid into position upon the ends of a box, an end tucker carried by said machine for entry between the lid and the end of a box to engage and press the contents thereof to a position within the end boundary of the box, and engageable by the end of said box as said press frame and said nailing table are relatively moved toward each other to move said tucker to a position outside of the boundary of the said box.

24. In a box lidding and nailing machine, a nailing table for supporting boxes ready to be lidded, means mounted upon said machine above said nailing table for engaging and pressing lids upon said boxes, driving means for causing relative movement between said nailing table and said lid engaging means toward and away from each other, an end tucker carried by said box lid engaging means and movable into a position between the lid and a box on said table responsive to the initial movement of the driving means to thereby cause said tucker to press overhanging contents to positions within the end boundary of said box.

25. In a box lidding and nailing machine, a nailing table for supporting boxes ready to be lidded, means for engaging and pressing lids upon boxes mounted upon said machine above said nailing table, driving means for causing relative movement between said nailing table and said lid engaging means toward and away from each other to press lids upon boxes on said table, a tucker carried by said box lid engaging means, means operably responsive to the initial movement of said driving means for moving said tucker into a position between the lid and the box to press overhanging contents to position within the end boundary of the box, said tucker being engageable by the end of said box and movable thereby to a position outside of the boundary of said box upon further relative movement between said nailing table and said lid engaging means toward each other.

26. In a box lidding and nailing machine, a nailing table for supporting boxes to be lidded, means for engaging and pressing lids upon boxes mounted upon said machine above said nailing table, driving means for causing relative movement between said nailing table and said lid engaging means toward and away from each other to press lids upon boxes on said table, a tucker support carried by said lid engaging means, an end tucker carried by said support, means operably responsive to the initial movement of said driving means for moving said support to place said tucker into a position between the lid and the box to press the overhanging contents to position within the end boundary of the box, and means movably mounting said tucker on said support, said tucker being engageable by the end of said box and movable thereby to a position free of the end of the box upon further relative movement of said nailing table and said lid engaging means toward each other.

27. In a box lidding and nailing machine, a nailing table for supporting boxes ready to be lidded, means for engaging and pressing lids upon said boxes mounted upon said machine above said nailing table, driving means for causing relative movement between said nailing table and lid engaging means toward and away from each other to press lids upon boxes on said table, a tucker support carried by said box lid engaging means, an end tucker carried by said supporting means operably responsive to the initial movement of said driving means for moving said support into a position between the lid and the box to press overhanging contents to positions within the end boundary of the box, and means pivotally mounting said tucker on said support, said tucker being engageable by the end of said box and movable thereby to a position free of the end of said box upon further relative movement of said nailing table and said lid engaging means toward each other.

28. In a box lidding and nailing machine, a nailing table for supporting boxes ready to be lidded, means for engaging and pressing lids upon boxes reciprocably mounted above said nailing table, driving means for moving said box lid engaging means toward and away from a box on said nailing table, an end tucker carried by said box lid engaging means, and means operably responsive to the initial movement of said driving means for moving said tucker into position between the lid and the box to press overhanging contents to positions within the end boundary of said box.

29. In a box lidding and nailing machine, a nailing table for supporting boxes in position to be nailed, a press frame for pressing lids into position upon a box, means mounting said press frame and said nailing table for relative reciprocatory movement toward and away from each other, a flusher pivotally mounted upon said press frame for aligning the end of the box and the end of a lid, means normally holding said flusher in an extended position out of alignment with a box on said nailing table, means for relatively moving said press frame and said nailing table toward each other to press the lid upon said box, means connecting said moving means to said flusher to move said flusher inwardly upon initial relative movement of said press frame and said nailing table toward each other, a tucker pivotally secured to the outer end of said flusher, extending inwardly of said flusher when said flusher is in its inward position to press the contents of the box within the end boundary of the box and movable upon further relative movement of said press frame and said nailing table toward each other to a position outside of the end boundary of the box.

30. In a box lidding and nailing machine, a nailing table for supporting boxes to be lidded, a press frame for pressing lids into positioning upon boxes, means mounting said press frame and said nailing table for relative reciprocatory movement toward and away from each other, a flusher secured to said press frame for aligning the end of a box and the end of a lid, a tucker pivotally mounted upon said flusher for engaging and pressing the contents of the box inwardly when said flusher is engaged by the lid, said tucker being movable about its pivot when engaged by the box for swinging the tucker out of alignment with the box when said press frame and said nailing table are relatively moved toward each other to press the lid upon the box.

31. In a machine for pressing and securing a cover on a box whose contents extend above the vertical walls of the box: means operable to engage a cover at portions adjacent the ends thereof and to press the end portions of said cover downwardly into engagement with the end walls of a box, and end tucker means automatically operable to press the upper contents of the box inwardly within the planes of the inner surfaces of the end walls of the box during the first part of the movement of the cover into such engagement by said cover pressing means.

32. In a machine for pressing and securing a cover on a box whose contents extend above the vertical walls of the box: side flushing means automatically operable to press the upper contents of the box inwardly within the planes of the inner surfaces of the side walls of the box, and end tucker means automatically operable to press the upper contents of the box inwardly within the planes of the inner surfaces of the end walls of the box, both of said means being operable to effect said pressing operations during the application of pressure on the cover of the box.

33. In a machine for pressing and securing a cover on a box whose contents extend above the vertical side walls of the box: means engaging the upper surface of the cover adjacent the outer ends thereof to force the same downwardly against the contents of said box, end tucker means automatically operable to press the upper contents of the box inwardly within the planes of the inner surfaces of the end walls of said box prior to and during the action of said first-named means, and side flushing means automatically operable to press the upper contents of the box inwardly within the planes of the inner surfaces of the side walls of said box prior to and during the action of said first-named means.

34. In a machine for pressing and securing a cover on a box whose contents extend above the vertical walls of the box: end tucker means automatically operable to press the upper contents of the box inwardly within the planes of the end walls of the box during the application of pressure to the cover, and means for withdrawing said tucker means from beneath the end portions of said cover prior to completion of movement of said end portions of said cover into engagement with the end walls of the box.

35. In a box lidding machine for pressing and securing a cover on a box whose contents extend above the vertical walls of the box: means operable to press the end portions of a cover downwardly toward and into engagement with the end walls of said box, and end tucker means operatively connected to said cover pressing means for pressing the upper contents of the box inwardly within the planes of the inner surfaces of the end walls of the box prior to completion of the movement of said cover by said cover pressing means.

36. In a machine for pressing and securing a cover on a box whose contents extend above the vertical walls of the box: means operable to press a cover downwardly toward the vertical walls of said box, box-cover aligning means operatively associated with said cover-pressing means adapted to engage the ends of said cover and align the same with the ends of said box, and end tucker means operatively connected to said aligning means for pressing the upper contents of the box inwardly within the planes of the inner surfaces of the end walls of the box prior to completion of the movement of said cover by said cover pressing means.

37. In a machine for pressing and securing a cover on a box whose contents extend above the vertical walls of the box: means operable to press a cover downwardly toward the vertical walls of said box, side flushing means operative in timed relation to said cover pressing means for pressing the upper contents of the box inwardly within the planes of the inner surfaces of the side walls of the box prior to completion of the movement of said cover by said cover pressing means, and end tucker means operative in timed relation to said cover pressing means for pressing the upper contents of the said box inwardly within the planes of the inner surfaces of the end walls of the box prior to completion of the movement of said cover by said cover pressing means.

38. In a machine for pressing and securing a cover on a box whose contents extend above the vertical walls of the box: means operable to press a cover downwardly toward the vertical walls of said box, end tucker means positioned adjacent the respective ends of the box, and means operative in timed relation to said cover pressing means and operable to move said end tucker means inwardly to press the upper contents of the box inwardly within the planes of the end walls of said box prior to completion of the movement of said cover by said cover. pressing means and to thereafter cause said tucker means to be withdrawn from beneath the end portions of said cover so as to permit said end portions to be brought into engagement with the end walls of the box by said cover pressing means.

39. In a box lidding apparatus for fruit and the like: table means adapted to receive a filled box whose contents extend upwardly above the vertical walls of said box: means for positioning said box on said table means; means operable to press the end portions of a box lid downwardly toward and into engagement with the end walls of said box; and end tucker means movable between an inoperative position outside the vertical planes of the end walls of said box and an operative position inside said vertical planes and directly above the top of said end walls so as to press in the contents of a box above said end walls, said end tucker means being operative in timed relation to said lid pressing means so as to cause movement of said end tucker means to operative position prior to completion of the downward movement of said lid by said lid pressing means.

40. In a box lidding apparatus for fruit and the like: table means adapted to receive a filled box whose contents extend upwardly above the vertical walls of said box; means for positioning said box on said table means; means operable to press the end portions of a box lid downwardly toward and into engagement with the end walls of said box; and end tucker means movable between an inoperative position outside the vertical planes of the end walls of said box and an operative position inside said vertical planes and above the top of said end walls so as to press inwardly the contents of the box above said end walls, said end tucker means being operative in timed relation to said lid pressing means so as to cause movement of said end tucker means to operative position prior to completion of the downward movement of said lid by said lid pressing means, and to cause subsequent movement of said end tucker means to inoperative position so as to permit the end portions of said lid to be brought into engagement with the end walls of said box by said lid pressing means.

41. In a box lidding and nailing machine, a nailing table, a reciprocating nailing head above said table for nailing lids to boxes, a press frame mounted above said nailing table for pressing lids into nailing position upon said boxes, means mounting said press frame and said nailing table for relative reciprocating movement toward and away from each other, and an end tucker carried by said frame and movable upon the initial relative movement of said press frame and said nailing table toward each other into a position between the lid and the box to press overhanging contents to positions within the boundary of said box.

42. In a box lidding apparatus for fruit and the like: table means adapted to receive a filled box whose contents extend upwardly above the vertical walls of said box; means for positioning said box on said table means, means operable to press the end portions of a box lid downwardly toward and into engagement with the end walls of said box; and end tucker means movable between an inoperative position outside the vertical planes of the end walls of said box and an operative position inside said vertical planes and above the top of said end walls so as to press inwardly the contents of the box above said end walls, said end tucker means being operative in timed relation to said lid pressing means so as to cause movement of said end tucker means to operative position prior to completion of the downward movement of said lid by said lid pressing means, and to cause subsequent movement of said end tucker means to inoperative position so as to permit the end portions of said lid to be brought into engagement with the end walls of said box by said lid pressing means, and means for moving said end tucker means upwardly above the position of a box on said table means so as to permit movement of boxes of fruit into and out of said position.

43. In a box lidding and nailing machine, a nailing table for supporting boxes to be lidded, a press frame for pressing lids into position upon boxes, means for mounting said press frame for reciprocation above said nailing table, an aligner secured to said press frame for aligning the end of the box and the end of the lid, and a tucker bar pivotally mounted upon said aligner for engaging and pressing the contents of the box inwardly when said aligner is engaged by the lid, said tucker being movable about its pivot when engaged by the box to swing the tucker out of alignment with the box when said press frame is drawn downwardly to press the lid on the box.

44. In a box lidding and nailing machine, a nailing table for supporting boxes in position to be nailed, a press frame reciprocably mounted above said nailing table to press lids upon said boxes into nailing position, an aligner pivotally mounted upon said press frame and reciprocable therewith, means normally holding said aligner in an extended position out of alignment with a box to be nailed, means for drawing said press frame downwardly to press a lid upon said box, means connecting said press frame drawing means to said aligner to move said aligner inwardly upon the initial movement of said press frame drawing means, and a tucker pivotally secured upon the outer end of said aligner, said tucker extending inwardly of said aligner when said aligner is in its inner position to press the contents of the box within the end boundary of the box and engageable with the upper edge of the box when said press frame is drawn downwardly to move said tucker about its pivot to a position outside the end boundary of said box.

45. In a box lidding and nailing machine, a nailing table for supporting boxes in position to be nailed, a press frame for pressing lids into nailing position upon said box, means mounting said press frame for reciprocation toward and away from said nailing table, means for moving said press frame toward said nailing table, including a connecting rod, a crank rotatable in said press frame connected to said connecting rod, stop means on said press frame for limiting the rotary movement of said crank, an aligner pivotally connected to said press frame and movable by rotation of said crank into a position of alignment with a box to be nailed, and a tucker pivotally mounted upon said aligner and normally extending inwardly of said aligner for engaging and pressing contents of a box within the end boundary of said box when said aligner is in alignment with the end of said box.

46. In a box lidding and nailing machine, a nailing table for supporting boxes in position to be nailed, a press frame reciprocably mounted above said nailing table for movement toward and away from said nailing table to press a lid into nailing position upon said box, means for moving said press frame toward said nailing table including a rotatable shaft, a front side flusher extending substantially the length of a box, means pivotally mounting said flusher for movement toward and away from said box, and a cam rotatable with said shaft for moving said flusher toward said box when said shaft is rotated to move said press frame downwardly towards said table.

47. In a box lidding and nailing machine, a nailing table for supporting boxes in position to be lidded, a press frame mounted above said nailing table and normally positioned above the position of a box on said nailing table, operating means for moving said nailing table and said press frame toward and away from each other, said press frame being provided with pressing members positioned to engage and press the end portions of a lid into nailing position in engagement with the end walls of said box upon movement of said nailing table and press frame toward each other, side flushing means extending longitudinally at one side of the position of said box and pivotally mounted for movement toward and away from said box, and means operatively associated with said operating means to move said side flushing means inwardly toward said box and press the upper contents of said box inwardly beyond the side boundary of said box upon initial movement of said operating means and prior to the engagement of said pressing members with said cover.

48. The invention as set forth in claim 47, said side flushing means being disposed at the front side of said box and extending substantially the full length of said box.

49. The invention as set forth in claim 47, said side flushing means being disposed at the rear side of said box and extending substantially the full length of said box.

50. In a box lidding and nailing machine, a table for supporting boxes in position to be nailed, a press frame mounted above said nailing table for movement toward and away from said nailing table to press a lid into nailing position upon said box, means for moving said press frame toward said nailing table, a rear side flusher extending substantially the length of said box, means pivotally mounting said flusher for movement toward and away from said box, and cam means including an element movable with said press frame for moving said flusher toward said box when said press frame is moved downwardly toward said table.

51. In combination: a frame; means on said frame for supporting a shipping case crown packed with fresh fruit or the like; a structure on said frame rising above said case supporting means; lid applying means mounted on said structure and overlying said supporting means; means for moving one of the aforementioned means toward the other to apply a lid to said case; and tucking means mounted with said lid applying means on said structure and actuated by said moving means, in timely relation with the lid applying operation, to move an overflow of the contents of said case inward between said lid and said case before the consummation of said operation, said tuckers being pivotally mounted over end portions of said box so as to swing outward from between said box and said lid just before the consummation of said lid applying operation.

52. In combination: means for applying a lid to a crown packed shipping case; and means operating automatically in timely relation with said lid applying means, to move a portion of the contents of said case overflowing the ends thereof, inward between the ends of said lid and said case before the consummation of said lid applying operation.

53. In a lidding machine, the combination of: means for supporting a crown packed case, means for pressing a lid on the case; means for relatively moving the aforementioned means toward each other to press said lid on said case; a tucker horizontally pivoted on said lid pressing means on an axis which is disposed above said case when said lid is pressed thereon; and power means for swinging said tucker inward as said pressing means approaches said case to tuck a crown portion of the contents of said case inwardly between said case and said lid.

54. A combination as in claim 53 in which the contents engaging portion of said tucker is in the form of a sector of a cylinder pivotally mounted so as to be rotated upwardly relative to said case after the tucking movement of said tucker.

55. In a combined lidding and strapping machine, a lidding machine and a strapping machine positioned adjacent each other, means for successively transferring boxes from said lidding machine to said strapping machine in response to completion of lidding operations of said lidding machine on said boxes, and means operable by actuation of said lidding machine to secure a lid upon a box for actuating the strapping machine to apply a strap to a box.

56. In a box lidding and nailing machine, a box support, a press frame above said support for pressing a box lid into nailing position upon a box on said box support in response to relative movement between said support and press frame toward each other, a nailing head reciprocably mounted above said support for nailing a lid pressed against a box on said support by said press frame, power means for reciprocating said nailing head, manually operable means for effecting relative movement between said support and press frame into lid pressing position, and releasable means for operatively connecting said nailing head power means to said manually operable means to effect relative movement between said support and pressing means by power.

57. In a box lidding and nailing machine, means for pressing a lid into nailing position upon a box, an end tucker carried by said machine, and means for supporting it between a lid and the box while said pressing means is pressing a lid toward the box, said tucker being engageable by the end of said box and movable thereby to a position free of the end of said box upon final movement of said lid-pressing means sufficient to press the lid into nailing position on the box.

58. In a box-lidding apparatus, table means adapted to receive an overpacked box and support the box during a lidding operation, means for applying a lid to said box while it is supported on said table means, end tucker means operating automatically in timed relation with said lid-applying means to move a portion of the contents of said box overflowing the ends thereof inward between the ends of said lid and said box before the consummation of said lid-applying operation, and means for moving said end tucker means upwardly clear of boxes on said table means so as to permit movement of boxes horizontally on said table.

HERBERT E. TWOMLEY.